United States Patent Office 2,877,126
Patented Mar. 10, 1959

2,877,126

MAGNESIUM-ZINC PAINT PIGMENTS

Lawrence Whitby, Bay City, Mich., assignor to The Dow Chemical Company, Midland, Mich., a corporation of Delaware No Drawing. Application November 5, 1956
Serial No. 620,203

3 Claims. (Cl. 106—290)

This invention is concerned with paint pigments containing a pulverulent binary alloy of magnesium and zinc.

The protective properties of paints containing zinc chromate or alkaline earth chromates, e. g., calcium or strontium chromate, when applied to iron, magnesium, aluminum and their alloys, are known. It is known to incorporate particulate zinc metal in anti-corrosive priming paints for use on iron and steel. It is also known to produce a rust-inhibitive aluminum pigmented paint by treating aluminum particles with a fatty acid, flaking the particles, mixing the thus-treated particles in a strontium chromate paint paste, and dispersing the mixture in a vehicle.

The dispersed zinc metal alone offers but limited protection against corrosion to iron and steel and no observed protection to aluminum or magnesium surfaces. The fatty acid treated aluminum flake results in the flakes being insulated by the fatty acid and, as a result, forms a discontinuous layer or coating. Such coating, although enhancing the appearance of a surface and offering some degree of protection of a physical nature, affords but small protection against corrosion.

There is a desideratum in the art for a zinc chromate or alkaline earth chromate-pigmented coating composition that contains metallic particulate bodies which, when applied to metal surfaces, e. g., articles of iron, aluminum, magnesium, or their alloys, affords protection against corrosion and enhances the appearance of such metals and alloys to a greater extent than do coating compositions now known. There is an especial need for such a coating composition which is universally applicable as a primer or base coating composition for iron and aluminum-base alloys and which provides an appreciable degree of protection to uncoated areas which are adjacent to areas coated by such composition. Scuffs and scratches in the coated surface as well as corners and edges not fully coated during the coating operation are thereby provided with some protection.

Accordingly, the principal object of the invention is to provide a pigment containing particulate metallic bodies useful in the preparation of pigmented coating compositions for their protection and for enhancing the appearance of metal articles, e. g., those of iron, aluminum, and magnesium and their alloys.

Another object of the invention is to provide a pigment especially suitable for the preparation of a primer or base coating for metal articles.

The invention then comprises a novel pigment for making pigmented coating compositions containing particulate bodies of magnesium-zinc alloy and a chromate selected from the chromates of zinc and alkaline earth metals, e. g., strontium, the method of preparing such a pigment, and the pigmented coating composition containing such pigment.

According to the invention, substantially pure magnesium and zinc metals, in a ratio of between 70 and 85 percent zinc to between 30 and 15 percent magnesium by weight are fused together preferably in the presence of a suitable flux, into a substantially homogeneous mass thereby forming a brittle alloy of magnesium and zinc. Among the alloy compositions which may be formed by thus fusing magnesium and zinc are the brittle intermetallic compounds of MgZn and $MgZn_2$. If desired, the temperature may be held at slightly above the fusion temperature for a short time, say .25 to .75 hour to insure complete fusion. The thus-formed alloy is cast into a block or other shape by pouring it into a mold and cooling it. The thus-molded block which is of a brittle nature is broken into bits by a hammer, pestle or other means and pulverized, as by grinding in a ball mill, to a fineness sufficient to permit at least 98 percent to pass through a No. 325 standard mesh screen (United States standard sieve series).

The thus-pulverized magnesium-zinc alloy is admixed with finely particulated, e. g., pigment grade, zinc chromate or an alkaline earth chromate and a conventional coating vehicle used for chromate pigments. The pulverized magnesium-zinc alloy may be mixed with the chromate and then admixed with the vehicle or they may be added directly to the coating vehicle, which either already contains at least one of the above chromates, or to a suitable vehicle alone and subsequently adding the chromate to the vehicle containing the pulverized magnesium-zinc alloy.

The ratio of the pulverized magnesium-zinc alloy to the zinc or alkaline earth chromate in the mixture so obtained is between 80:20 and 20:80 by volume. The preferable range is about 50:50 on a volume basis.

By a conventional coating vehicle is meant any organic liquid film former commonly used in the paint and varnish industry in paint, varnish, lacquer, primer, and enamel formulations, e. g., drying oils such as linseed oil or a linseed oil-modified alkyd resin plus a volatile thinner as required such as a mineral spirit or xylene. A liquid vehicle, containing the oil-modified resin, is referred to in the art as a bodied resin-oil vehicle. The vehicle suitable for use in the invention may also contain such additaments, in amounts employed in the art, as an anti-skinning agent, e. g., dipentene; a gelling agent, e. g., 1 to 10 percent aluminum stearate gel in xylene; an extender such as asbestine; and a drier such as a naphthenate or oleate of manganese, lead, or cobalt. Other pigments, e. g., iron oxides or organic dyes may be present or added to the vehicle. The pulverized magnesium-zinc alloy, together with the chromate and vehicle containing other functional ingredients as desired and as described above, may be intermixed in accordance with known practice as in a ball mill or roller mill.

The coating compositions formulated according to the invention possess excellent can-storage stability and may be readily applied to metal surfaces by the usual methods of application, e. g., brushing or spraying. They possess excellent drying properties.

The preferred chromate to be employed in practicing the invention is zinc chromate. The coating produced when zinc chromate is applied as the chromate of the invention is of an olive drab color which is highly stable to light and atmospheric conditions.

The following examples illustrate variations in the formulation of the pigmented coating of the invention. The effectiveness of the coating in protecting panels of steel, and aluminum-base and magnesium-base alloys is shown by application of the coating of the invention to such panels and subjecting the thus-coated panels to corrosion tests which are explained hereinafter. Formulations containing only one of either the magnesium-zinc alloy powder or zinc chromate were also run as blanks for comparative purposes. They show the high susceptibility to attack of narrow uncoated areas on the panels of mild steel and aluminum-base alloy when the adjacent area of the panels is not protected by the pigmented coating of the invention. The blanks also show the higher degree of corrosion suffered by panels of magnesium-base alloy as compared to panels coated by the novel coating composition of the invention.

For use in the blanks for comparison purposes and in the examples of the invention, a composition, comprising a vehicle and non-pigment solid ingredients, was prepared by mixing together the following ingredients in the proportions shown in Table I.

TABLE I

| Ingredient | Grams |
| --- | --- |
| Asbestine (largely fibrous magnesium silicate) | 96.00 |
| 10 percent aluminum stearate in xylene | 80.00 |
| Medium oil-length linseed oil-modified alkyd resin, 60% by weight in xylene | 548.00 |
| Phenol-formaldehyde resin, 50% by weight in an aliphatic solvent | 380.00 |
| Malic acid | 3.00 |
| Xylene | 1,273.00 |
| Dipentene | 30.00 |
| Lead naphthenate | 0.50 |
| Cobalt naphthenate | 0.05 |

A number of batches of the vehicle composition according to Table I were prepared to be used in the manner hereinafter explained.

The vehicle composition of Table I is illustrative of but one of a wide selection of vehicles known as resin-bodied vehicles which are acceptable in the coating art for use in zinc chromate-base paints. Any vehicle which is acceptable for use with zinc chromate-base paints is satisfactory for the practice of the invention.

The magnesium-zinc binary alloy for use with zinc chromate in the above vehicle composition in accordance with the invention was prepared as follows:

Two batches of magnesium were weighed and melted in an induction furnace in the presence of a flux comprising: 55 grams KCl, 34 grams $MgCl_2$, 9 grams $BaCl_2$, 2 grams $CaF_2$ and 5 grams NaCl. Preheated zinc metal was then added to each of the batches of molten magnesium to give the stoichiometric combining weights of 65.38 grams of zinc to 24.32 grams of magnesium to form batch X and 130.76 grams of zinc to 24.32 grams of magnesium to form batch Y, respectively. These stoichiometric amounts gave percentage compositions of 72.9% zinc and 27.1% magnesium in batch X and 84.3% zinc and 15.7% magnesium in batch Y. These alloy compositions are those shown in Table III.

The temperature of the melts of batches X and Y was raised to 1400° F. and superheated at this temperature for 30 minutes. The superheated batches were then poured into preheated molds respectively, and thereafter cooled. Each of the brittle alloys of magnesium and zinc thus formed was broken into bits and then separately placed in a pebble mill and pulverized therein to form alloy batches, the particle size of which was reduced sufficiently to permit 98 percent of each of the thus-formed pulverulent alloys to pass through a No. 325 standard sieve.

To prepare the coating compositions used in the blanks and the examples set out in Table III, zinc chromate and portions of the batches of the magnesium-zinc alloys X and Y, prepared as above described, were admixed under an agitator to successive batches of the vehicle composition prepared according to the formulation of Table I.

To a first batch of the vehicle composition of Table I were admixed 428 grams of binary alloy X to prepare coating composition A used to coat the sample panels designated a, e, and i in Table III.

To a second batch of the same vehicle composition were admixed 336 grams of binary alloy Y to prepare the coating composition B used to coat sample panels designated blanks c, g, and k in Table III.

To a third batch of the same vehicle composition were admixed 280 grams of zinc chromate to prepare coating composition C used to coat the sample panels designated blanks b, d, f, h, j, and l of Table III.

To prepare the coating compositions used to coat the panels of Examples 1 to 18 of the invention, as set out in Table III, the following ratios of compositions A, B, and C, set out in Table II were used. Coating compositions A, B, and C contained equal volumes of the pigments in equal weights of vehicle composition. Since the pigments were substantially uniformly dispersed in the vehicle, proportionate weights of the vehicle contained the same proportionate volume of the pigment.

TABLE II

| Percent Mg-Zinc by Volume | Percent $ZnCrO_4$ by Volume | Batch A by Weight [1] | Batch B by Weight [1] | Batch C by Weight [1] | Examples in which used |
| --- | --- | --- | --- | --- | --- |
| 75 | 25 | 3 | | 1 | 1, 7 and 13. |
| 50 | 50 | 2 | | 2 | 2, 8, and 14. |
| 25 | 75 | 1 | | 3 | 3, 9, and 15. |
| 75 | 25 | | 3 | 1 | 4, 10, and 16. |
| 50 | 50 | | 2 | 2 | 5, 11, and 17. |
| 25 | 75 | | 1 | 3 | 6, 12, and 18. |

[1] In Parts:
Batch A = 428 grams of Batch X + the vehicle according to Table I.
Batch B = 336 grams of Batch Y + the vehicle according to Table I.
Batch C = 280 grams of zinc chromate + the vehicle according to Table I.

The control or blank compositions and examples prepared as described hereinabove were used to coat metal panels prepared and coated as explained below.

Metallic panels having the dimensions of 3" x 6" x 0.064", composed of mild alloy steel, aluminum-base alloy designated Aluminum Association No. 2024, and magnesium-base alloy AZ31 respectively, were cleaned, pickled, rinsed, and dried according to known practices. The composition of the mild steel is set out broadly in Metals Handbook of the Society for Metals (1948), page 534. The composition of the aluminum-base alloy is that designated ASTM A-109-495. The AZ31 magnesium-base alloy has a nominal composition of 3 percent aluminum, 1 percent zinc, about 0.2 percent manganese, and the balance magnesium. The panels were evenly coated by brush application of the coating compositions prepared as described above.

The percent composition of the paints used to coat the panels is set out in Table III (the percent magnesium and zinc in the pulverized alloy is by weight). The percent of the magnesium-zinc alloy and the zinc chromate in the coating compositions are set out by volume.

The coated panels were tested by subjecting them to the action of a corrosive atmosphere of either a salt spray fog as in A. S. T. M. B-117-54T test, or the humid air test explained below. The salt spray test, as applied to blank panels and panels coated according to the invention, comprises subjecting the panels to a fine mist of salt solution made up of about 20 parts of sodium chloride dissolved in 80 parts of water by weight, in a substantially corrosion-proof box maintained at 95° F. The humid air test comprises exposing coated test panels to air of 95 percent or more relative humidity at 95° F. For use in testing coatings prepared in the examples, the panels upon which the pigmented coating had been applied were, prior to being subjected to the test, scratched diagonally from corner to corner with a knife which was made to penetrate entirely through the coating to the metal. The corrosive atmosphere provided for the panels and the time of exposure are set out in Table III.

The protection afforded by the coating formed by application of the novel pigment coating of the invention and coatings formed on blanks for comparison were ascertained by three tests: (a) percent corrosion in and along scratch, (b) width of corrosion spreading from scratch, and (c) percent of painted surface showing rust or corrosion.

The first test, the percent corrosion in and along each scratch, consisted essentially of ascertaining by linear measurement along the scratch the distance which was corroded and calculating what percent the corroded distance was of the entire length of the scratch. The purpose of this test was to show the extent of protection afforded to uncoated areas, viz, scratches, when adjacent to a coated area.

The second test, the width of corrosion spreading from a scratch, consisted of measuring at right angles to the scratch the linear distance from the scratch to which the coating was loosened from the metal panel; the average of such distances in millimeters measured at several places along the scratches was recorded. The purpose of this test was to show the effect of the corrosion on the bond between the coating composition and the metal.

The third test, percent of painted surface of panels corroded, took into consideration the area exposed, exclusive of the portions of the area taken up by the scratches. This test consisted essentially of measuring the unscratched area of the coated surface, which was corroded, and calculating the percentage that the thus-measured corroded area was of the original coated surface, exclusive of the scratches. The purpose of this test was to show the protection afforded to metal surfaces which are covered by the novel coating composition of the invention.

Table III sets forth: the type of panels coated, the binary alloys used in the coating composition, the volume ratio of the binary alloy to zinc chromate in the coating, and the test results.

are adjacent to areas coated by the novel coating composition of the inventor. The uncoated areas on the panels are illustrated by the scratches which penetrated the coating to expose the bare metal. This protection has wide application in protecting such alloys after the coating has been scuffed, marred or scratched in usage as well as affording protection to crevices and edges which are not readily accessible or are easily overlooked when the coating is applied.

The results of the tests also show that the protection afforded by the novel pigmented coating of the invention is at least as good as straight zinc chromate-base paint in the protection of aluminum, slightly superior in the protection of steel, and definitely superior in its protection of magnesium in a highly corrosive atmosphere. While the examples of the invention have employed zinc chromate, the alkaline earth chromates, e. g., chromates of barium, strontium and calcium, may be used in the same volume ratios to the magnesium-zinc binary alloy as was the zinc chromate. For example, when $SrCrO_4$ is substituted for the zinc chromate in the examples, the results obtained compare favorably with those obtained with zinc chromate.

Having described the invention, what is claimed and desired to be protected by Letters Patent is:

1. A pigment for pigmenting coating compositions, said pigment consisting of an admixture of (a) between 80 and 20 percent by volume of a particulate binary alloy consisting of magnesium in an amount between 30 and 15 weight percent and zinc in an amount between 70 and 85 weight percent and (b) between 20 and 80 percent by volume of a chromate selected from the class consisting of chromates of zinc and alkaline earth metals.

TABLE III

*Test results of panels protected by coatings of Mg—Zn and $ZnCrO_4$*

| Designation | | Alloy Batch in Composition | Volume Percent of Mg-Zn Alloy and $ZnCrO_4$ | | Test Results | | | |
|---|---|---|---|---|---|---|---|---|
| Panel Coated | Test No. | | Mg-Zinc Alloy | $ZnCrO_4$ | Atmosphere and Time Exposed | Percent Corrosion in and along Scratch | Width of Corrosion Spread From Scratch, mm. | Percent Coated Surface Showing Corrosion |
| Mild Alloy Steel | Blank a | Batch X | 100 | 0 | Humid Air 4,000 hr. | 100 | 2 | 10 |
| | Ex. 1 | do | 75 | 25 | do | 80 | 2 | 0 |
| | Ex. 2 | do | 50 | 50 | do | 50 | 0 | 0 |
| | Ex. 3 | do | 25 | 75 | do | 80 | 1 | 0 |
| | Blank b | do | 0 | 100 | do | 100 | 1 | 0 |
| | Blank c | Batch Y | 100 | 0 | do | 100 | 2.0 | 5 |
| | Ex. 4 | do | 75 | 25 | do | 80 | 0.5 | 0 |
| | Ex. 5 | do | 50 | 50 | do | 50 | 0.5 | 0 |
| | Ex. 6 | do | 25 | 75 | do | 80 | 0.5 | 0 |
| | Blank d | do | 0 | 100 | do | 100 | 1.0 | 0 |
| Aluminum base Alloy No. 2024 | Blank e | Batch X | 100 | 0 | Salt Spray 5,000 hr. | 100 | 0 | 0 |
| | Ex. 7 | do | 75 | 25 | do | 15 | 0 | 0 |
| | Ex. 8 | do | 50 | 50 | do | 10 | 0 | 0 |
| | Ex. 9 | do | 25 | 75 | do | 20 | 0 | 0 |
| | Blank f | do | 0 | 100 | do | 50 | 0 | 0 |
| | Blank g | Batch Y | 100 | 0 | do | 100 | 0 | 0 |
| | Ex. 10 | do | 75 | 25 | do | 15 | 0 | 0 |
| | Ex. 11 | do | 50 | 50 | do | 10 | 0 | 0 |
| | Ex. 12 | do | 25 | 75 | do | 10 | 0 | 0 |
| | Blank h | do | 0 | 100 | do | 50 | 0 | 0 |
| Magnesium base Alloys AZB1 | Blank i | Batch X | 100 | 0 | Salt Spray 1,500 hr. | Not determined. | 10 | 30 |
| | Ex. 13 | do | 75 | 25 | do | do | 3 | 0 |
| | Ex. 14 | do | 50 | 50 | do | do | 2 | 0 |
| | Ex. 15 | do | 25 | 75 | do | do | 3 | 1 |
| | Blank j | do | 0 | 100 | do | do | 5 | 10 |
| | Blank k | Batch Y | 100 | 0 | do | do | 10 | 30 |
| | Ex. 16 | do | 75 | 25 | do | do | 3 | 0 |
| | Ex. 17 | do | 50 | 50 | do | do | 2 | 0 |
| | Ex. 18 | do | 25 | 75 | do | do | 3 | 1 |
| | Blank l | do | 0 | 100 | do | do | 5 | 10 |

Batch X=27.1% Mg, 72.9% Zn, ≅ MgZn; Batch Y=15.7% Mg, 84.3% Zn≅$MgZn_2$.

The results of the tests set forth in Table III show the protection provided by the novel coating composition to uncoated areas on steel and aluminum-base alloys which 2. A pigment for pigmenting coating compositions, said pigment consisting of an admixture of (a) between 80 and 20 percent by volume of an intermetallic binary compound containing stoichiometric quantities of magnesium and zinc metals and (b) between 20 and 80 percent by volume of a chromate selected from the class consisting of the chromates of zinc and alkaline earth metals, said binary being within the range of 70 to 85% of zinc and 30 to 15% of magnesium.

3. A pigment according to claim 1 wherein the chromate is zinc chromate.

References Cited in the file of this patent

UNITED STATES PATENTS

| | | |
|---|---|---|
| 1,468,407 | Schrotter | Sept. 18, 1923 |
| 2,313,799 | Bullitt | Mar. 16, 1943 |
| 2,331,270 | George | Oct. 5, 1943 |
| 2,430,589 | Sloan | Nov. 11, 1947 |

FOREIGN PATENTS

| | | |
|---|---|---|
| 226,286 | Great Britain | Dec. 22, 1924 |
| 705,166 | Great Britain | Mar. 10, 1954 |